(12) United States Patent
Akiyama (10) Patent No.: US 10,725,365 B2
(45) Date of Patent: Jul. 28, 2020

(54) ILLUMINATION DEVICE AND PROJECTOR

(71) Applicant: SEIKO EPSON CORPORATION, Tokyo (JP)

(72) Inventor: Koichi Akiyama, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 1 day.

(21) Appl. No.: 16/142,181

(22) Filed: Sep. 26, 2018

(65) Prior Publication Data

US 2019/0094672 A1  Mar. 28, 2019

(30) Foreign Application Priority Data

Sep. 27, 2017 (JP) ................................. 2017-185853

(51) Int. Cl.
*G03B 21/20* (2006.01)
*G03B 33/12* (2006.01)

(52) U.S. Cl.
CPC ....... *G03B 21/204* (2013.01); *G03B 21/2013* (2013.01); *G03B 21/2073* (2013.01); *G03B 33/12* (2013.01)

(58) Field of Classification Search
CPC ............ G03B 21/2013; G03B 21/2073; G03B 33/12; G03B 21/204
See application file for complete search history.

(56) References Cited

U.S. PATENT DOCUMENTS

| 2014/0036241 | A1* | 2/2014 | Nishimori | ............. F21V 7/0083 353/85 |
| 2014/0185285 | A1* | 7/2014 | Jorgensen | .......... G02B 19/0066 362/232 |
| 2014/0313715 | A1 | 10/2014 | Matsuo et al. | |
| 2015/0153020 | A1* | 6/2015 | Akiyama | ............. H04N 9/3194 353/20 |
| 2015/0301438 | A1 | 10/2015 | Akiyama et al. | |

FOREIGN PATENT DOCUMENTS

| JP | 2015-038958 A | 2/2015 |
| JP | 2015-106130 A | 6/2015 |
| JP | 2015-203857 A | 11/2015 |

* cited by examiner

*Primary Examiner* — Isiaka O Akanbi
*Assistant Examiner* — Nathaniel J Lee
(74) *Attorney, Agent, or Firm* — Oliff PLC (57) ABSTRACT

An illumination device according to the invention includes a light source section including a plurality of light emitting devices adapted to emit light, and a holding member adapted to hold the plurality of light emitting devices, a polarization separation element adapted to separate the light emitted from the light source section into a first light beam and a second light beam, a wavelength conversion device adapted to convert the first light beam into a third light beam, a conversion optical system adapted to convert the second light beam into a fourth light beam, a color combining element, a detection device adapted to detect an intensity of the third light beam and an intensity of the fourth light beam, and a control device adapted to change a polarization state of the light emitted from the light source section in accordance with a detection result by the detection device.

20 Claims, 7 Drawing Sheets

ILLUMINATION DEVICE AND PROJECTOR

BACKGROUND

1. Technical Field

The present invention relates to an illumination device and a projector.

2. Related Art

In recent years, a projector using a laser source as a light source wide in color gamut and high in efficiency with the view to an improvement in performance of the projector attracts attention. In, for example, JP-A-2015-38958 (Document 1), there is disclosed a light source device provided with a plurality of semiconductor lasers, and a holding member having a rectangular shape for housing the plurality of semiconductor lasers.

In JP-A-2015-106130 (Document 2), there is disclosed an illumination device provided with a plurality of semiconductor lasers, a wave plate, a polarization separation element, a wavelength conversion device including a phosphor layer, a diffuse reflection element, a detection device, and a control device. In this illumination device, blue light emitted from the semiconductor lasers is transmitted through the wave plate to thereby be converted into light including a P-polarization component and an S-polarization component mixed at a predetermined rate. The S-polarization component is guided by the polarization separation element to the wavelength conversion device, and excites the phosphor layer to turn to yellow fluorescence. In contrast, the P-polarization component is guided by the polarization separation element to the diffuse reflection element, and turns to blue diffusive light. The blue diffusive light and the yellow fluorescence are combined with each other by the polarization separation element, and thus, white illumination light is emitted from the illumination device.

In the illumination device of Document 2, in the case in which, for example, the white balance of the illumination light is lost, the detection device detects an intensity ratio between the blue light and the yellow light, and the control device rotates the wave plate as much as a predetermined angle based on the detection result of the detection device. On this occasion, the ratio in light intensity between the P-polarization component and the S-polarization component entering the polarization separation element varies between before and after the rotation of the wave plate. Thus, it is possible to vary the ratio in light intensity between the blue light to be a part of the illumination light and the blue light to be used for the excitation of the phosphor layer, and therefore, it is possible to adjust the white balance of the illumination light.

However, if attempting to configure the illumination device of Document 2 using the light source device of Document 1, there arises the following problem.

In the light source device of Document 1, since the plurality of semiconductor lasers is arranged to have a rectangular shape, the cross-sectional shape of the entire light beam including the plurality of laser beams emitted from the plurality of semiconductor lasers also has a rectangular shape. Therefore, if attempting to obtain high light utilization efficiency, the optical system such as a homogenizer optical system or a pickup optical system grows in size, and thus, the illumination device grows in size. By using the afocal optical system, the width of the emitted light is reduced, and thus, it is possible to contract the optical system described above, but the illumination device grows in size by the afocal optical system added thereto.

Further, in the illumination device of Document 2, the wave plate is used in order to adjust the ratio in light intensity between the P-polarization component and the S-polarization component. However, in the case of using the semiconductor laser as a light source, since the luminance of the light from the semiconductor laser is high, it is necessary to use the wave plate high in heat resistance. Therefore, it is necessary to use a valuable wave plate such as a liquid crystal wave plate, and there is a problem that the cost of the illumination device rises.

SUMMARY

An advantage of some aspects of the invention is to provide a small-sized illumination device capable of adjusting the color balance without using the valuable wave plate. Another advantage of some aspect of the invention is to provide a projector equipped with the illumination device described above.

An illumination device according to an aspect of the invention includes a light source section including a plurality of light emitting devices adapted to emit light in a first wavelength band, and a holding member adapted to hold the plurality of light emitting devices at rotationally symmetric positions, a polarization separation element adapted to separate the light emitted from the light source section into a first light beam in a first polarization state and a second light beam in a second polarization state, a wavelength conversion device having a wavelength conversion layer to be excited by light in the first wavelength band, and adapted to convert the first light beam into a third light beam in a second wavelength band different from the first wavelength band, a conversion optical system adapted to convert the second light beam into a fourth light beam, a color combining element adapted to combine the third light beam and the fourth light beam with each other, a detection device adapted to detect an intensity of the third light beam and an intensity of the fourth light beam, and a control device adapted to change a polarization state of the light emitted from the light source section in accordance with a detection result by the detection device.

In the illumination device according to the aspect of the invention, the composite light of the third light beam and the fourth light beam combined by the color combining element is used for the illumination. It is assumed that the intensity of the light emitted from the light emitting device drops due to, for example, a temporal change. On this occasion, when the intensity of the first light beam entering the wavelength conversion device drops due to the drop of the intensity of the light from the light emitting device, the conversion efficiency of the wavelength conversion layer changes, and thus, the ratio between the intensity of the third light beam and the intensity of the fourth light beam changes. As a result, there arises a problem that the color balance is lost with respect to the state before the temporal change of the light emitting device.

To deal with this problem, the illumination device according to the aspect of the invention is provided with the detection device for detecting the intensity of the third light beam and the intensity of the fourth light beam, and the control device for changing the polarization state of the emitted light from the light source section in accordance with the detection result by the detection section. Therefore, by the detection device detecting the intensity of the third light beam and the intensity of the fourth light beam, it is possible to figure out the change of the color balance. Therefore, in the case in which the color balance has changed, the control device changes the polarization state of the emitted light from the light source section to adjust the proportions of the first light beam in the first polarization state and the second light beam in the second polarization state. In such a manner as described above, it is possible to adjust the intensity of the third light beam and the intensity of the fourth light beam to thereby adjust the color balance of the light emitted from the illumination device.

Further, since the illumination device according to the aspect of the invention is provided with the light source section having the plurality of light emitting devices held at the rotationally symmetric positions, it is possible to dispose the plurality of light emitting devices in a polygonal shape or a circular shape, and it is possible to achieve downsizing of the light source section. Further, since the control device changes the polarization state of the light emitted from the light source section in accordance with the detection result by the detection device, there is no need to use the wave plate for the adjustment of the polarization state. Thus, it is possible to realize the illumination device small in size and capable of adjusting the color balance without using the wave plate.

In the illumination device according to the aspect of the invention, the light emitting device may be formed of a semiconductor laser provided with a light emitting element, and a housing adapted to house the light emitting element inside, and the light source section may be provided with the seven light emitting devices. In this case, one of the seven light emitting devices may be disposed on the holding member so as to be located in a central part of the light source section, and other six of the light emitting devices may be disposed in a rotationally symmetric manner about a center of the holding member so as to surround the one of the seven light emitting devices.

According to this configuration, it is possible to realize the high-power and small-sized light source section.

In the illumination device according to the aspect of the invention, the seven light emitting devices may be disposed on the holding member so that the six light emitting devices are inscribed in a virtual circle centered on the center of the holding member, the one light emitting device has contact with the six light emitting devices, and angles formed between straight lines connecting light emission centers of the seven light emitting devices become equal to each other.

According to this configuration, it is possible to realize the high-power and small-sized light source section.

In the illumination device according to the aspect of the invention, the light emitting device may be formed of a semiconductor laser provided with a light emitting element, and a housing adapted to house the light emitting element inside thereof, and the light source section may be provided with the six light emitting devices. In this case, the six light emitting devices may be rotationally symmetric about a center of the holding member, and be disposed equally distant from the center of the holding member.

According to this configuration, it is possible to realize the high-power and small-sized light source section.

In the illumination device according to the aspect of the invention, the control device may rotate the light source section around a central axis of the light emitted from the light source section to thereby change a polarization state of the light emitted from the light source section.

According to this configuration, by appropriately changing the angle of the rotation of the light source section, the ratio between the first light beam in the first polarization state and the second light beam in the second polarization state can be adjusted at will.

In the illumination device according to the aspect of the invention, the holding member may have a circular shape.

According to this configuration, it is possible to simplify the configuration of the rotation mechanism of the light source section.

In the illumination device according to the aspect of the invention, a cross-sectional shape perpendicular to a central axis of the light emitted from the semiconductor laser may be an elliptical shape having a long-axis direction and a short-axis direction, and the control device may set a posture in which the light source section is rotated until the long-axis direction has a predetermined angle with a plane including the central axis of the light emitted from the semiconductor laser as a reference posture of the light source section, and may rotate the light source section from the reference posture in accordance with a detection result by the detection device.

According to this configuration, it is possible to set the ratio between the first light beam in the first polarization state and the second light beam in the second polarization state in the reference state.

In the illumination device according to the aspect of the invention, a cross-sectional shape perpendicular to a central axis of the light emitted from the semiconductor laser may be an elliptical shape having a long-axis direction and a short-axis direction, and the control device may set a posture in which some of the light emitting devices are held by the holding member so that the long-axis direction of the some of the light emitting devices has a predetermined angle with a plane including the central axis of the light emitted from the semiconductor laser as a reference posture of the light source section, and may rotate the light source section from the reference posture in accordance with a detection result by the detection device.

According to this configuration, it is possible to set the ratio between the first light beam in the first polarization state and the second light beam in the second polarization state in the reference state.

A projector according to another aspect of the invention includes the illumination device according to any one of the above aspects of the invention, a light modulation device adapted to modulate light emitted from the illumination device in accordance with image information, and a projection optical system adapted to project the light modulated by the light modulation device.

The projector according to the aspect of the invention is provided with the illumination device according to any one of the aspects of the invention, and is therefore excellent in display quality.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Hereinafter, a first embodiment of the invention will be described using FIG. 1 through FIG. 7.

A projector according to the present embodiment is an example of a liquid crystal projector equipped with a light source device using a semiconductor laser.

It should be noted that in each of the following drawings, the constituents are shown with the scale ratios of respective sizes set differently between the constituents in some cases in order to facilitate the visualization of each of the constituents.

Figure 1:
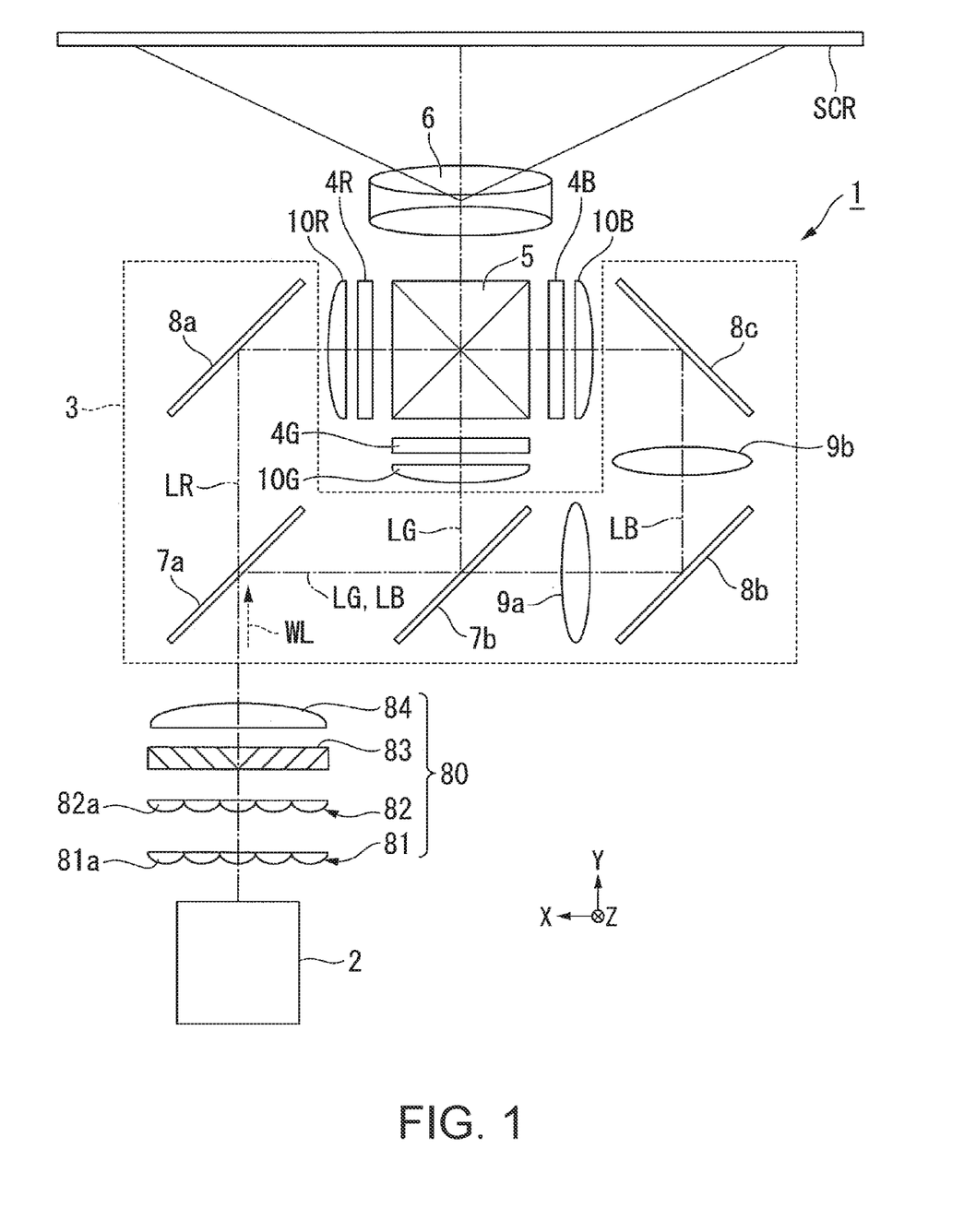
FIG. 1 is a schematic configuration diagram of a projector according to a first embodiment of the invention.

FIG. 1 is a schematic configuration diagram showing the projector according to the present embodiment.

As shown in FIG. 1, the projector 1 is schematically provided with an illumination device 2, a color separation optical system 3, a red-light light modulation device 4R, a green-light light modulation device 4G, a blue-light light modulation device 4B, a combining optical system 5, and a projection optical system 6.

The illumination device 2 emits illumination light WL having a roughly homogenized illuminance distribution toward the color separation optical system 3. As the illumination device 2, there is used an illumination device as the first embodiment of the invention described later.

The color separation optical system 3 separates the illumination light WL having been emitted from the illumination device 2 into red light LR, green light LG, and blue light LB. The color separation optical system 3 is provided with a first dichroic mirror 7a, a second dichroic mirror 7b, a first reflecting mirror 8a, a second reflecting mirror 8b, a third reflecting mirror 8c, a first relay lens 9a and a second relay lens 9b.

The first dichroic mirror 7a separates the illumination light WL having been emitted from the illumination device 2 into the red light LR, and the light including the green light LG and the blue light LB. The first dichroic mirror 7a transmits the red light LR, and reflects the green light LG and the blue light LB. The second dichroic mirror 7b separates the light having been reflected by the first dichroic mirror 7a into the green light LG and the blue light LB. The second dichroic mirror 7b reflects the green light LG and transmits the blue light LB.

The first reflecting mirror 8a is disposed in the light path of the red light LR. The red light LR having been transmitted through the first dichroic mirror 7a is reflected by first reflecting mirror 8a, and is guided to the red-light light modulation device 4R. The second reflecting mirror 8b and the third reflecting mirror 8c are disposed in the light path of the blue light LB. The blue light LB having been transmitted through the second dichroic mirror 7b is reflected and guided by the second reflecting mirror 8b and the third reflecting mirror 8c to the blue-light light modulation device 4B. The green light LG is reflected by the second dichroic mirror 7b, and then proceeds toward the green-light light modulation device 4G.

The first relay lens 9a and the second relay lens 9b are disposed on the light emission side of the second dichroic mirror 7b in the light path of the blue light LB. The first relay lens 9a and the second relay lens 9b compensate the optical loss of the blue light LB due to the fact that the optical path length of the blue light LB becomes longer than the optical path lengths of the red light LR and the green light LG.

The red-light light modulation device 4R modulates the red light LR in accordance with image information to form image light corresponding to the red light LR. The green-light light modulation device 4G modulates the green light LG in accordance with the image information to form image light corresponding to the green light LG. The blue-light light modulation device 4B modulates the blue light LB in accordance with the image information to form image light corresponding to the blue light LB.

As the red-light light modulation device 4R, the green-light light modulation device 4G, and the blue-light light modulation device 4B, there are used, for example, transmissive liquid crystal panels. Further, on the incident side and the exit side of each of the liquid crystal panels, there are disposed a pair of polarization plates not shown. The pair of polarization plates transmit the linearly-polarized light in a specific direction.

On the incident side of the red-light light modulation device 4R, there is disposed a field lens 10R. On the incident side of the green-light light modulation device 4G, there is disposed a field lens 10G. On the incident side of the blue-light light modulation device 4B, there is disposed a field lens 10B. The field lens 10R collimates the red light LR entering the red-light light modulation device 4R. The field lens 10G collimates the green light LG entering the green-light light modulation device 4G. The field lens 10B collimates the blue light LB entering the blue-light light modulation device 4B.

The combining optical system 5 combines the image light corresponding to the red light LR, the image light corresponding to the green light LG, and the image light corresponding to the blue light LB with each other, and then emits the image light thus combined toward the projection optical system 6. As the combining optical system 5, there is used, for example, a cross dichroic prism.

The projection optical system 6 is formed of a projection lens group including a plurality of projection lenses. The projection optical system 6 projects the image light combined by the combining optical system 5 toward the screen SCR in an enlarged manner. Thus, a color image thus enlarged is displayed on the screen SCR.

The illumination device 2 will hereinafter be described.

Figure 2:
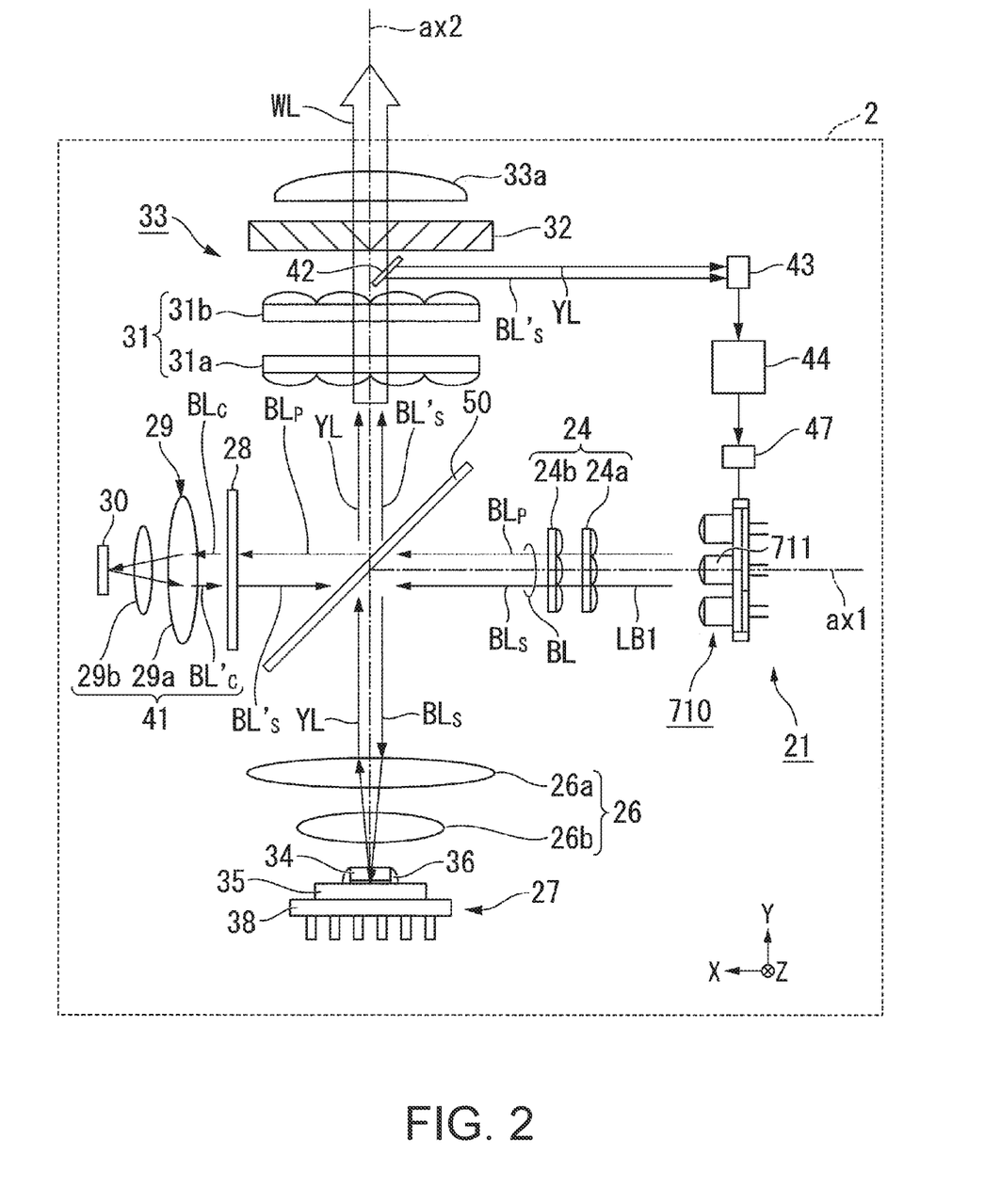
FIG. 2 is a schematic configuration diagram of an illumination device according to the first embodiment.

As shown in FIG. 2, the illumination device 2 is provided with a light source device 21, a homogenizer optical system 24, a polarization separation element 50, a first pickup optical system 26, a wavelength conversion device 27, a conversion optical system 41, a polarization conversion element 32, a superimposing optical system 33, a light intensity monitoring mirror 42, a sensor unit 43, a control device 44, and a motor 47.

Out of the constituents described above, the light source device 21, the homogenizer optical system 24, the polarization separation element 50, and the conversion optical system 41 are arranged in this order on an optical axis ax1. Meanwhile, the wavelength conversion device 27, the first pickup optical system. 26, the polarization separation element 50, the integrator optical system 31, the polarization conversion element 32, and a superimposing lens 33a are arranged in this order on an optical axis ax2. The optical axis ax1 and the optical axis ax2 are located in the same plane, and have a positional relationship of being perpendicular to each other.

Figure 3:
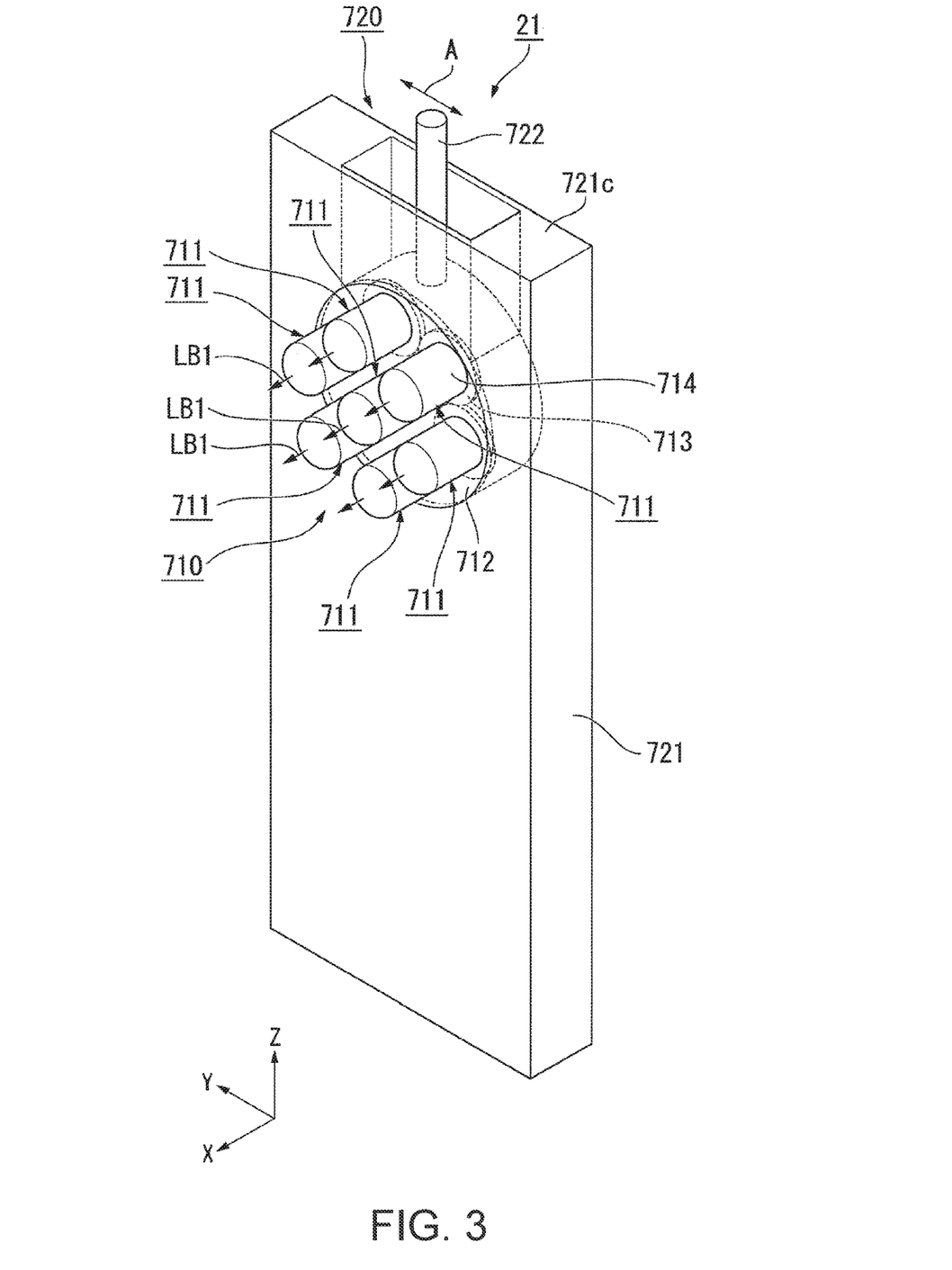
FIG. 3 is a perspective view of a light source device.

FIG. 3 is a perspective view of the light source device 21.

As shown in FIG. 3, the light source device 21 is provided with a light source section 710 provided with a plurality of semiconductor lasers 711, and a rotation mechanism 720 for rotating the light source section 710. The rotation mechanism 720 is provided with a frame section 721 and a rod-like section 722. The frame section 721 rotatably holds the light source section 710. The rod-like section 722 extends from one end of the light source section 710, and projects outside the frame section 721. The light source section 710 moves in a direction (direction indicated by the arrow A) along an end surface 721c of the frame section 721 to thereby rotate.

Figure 4:
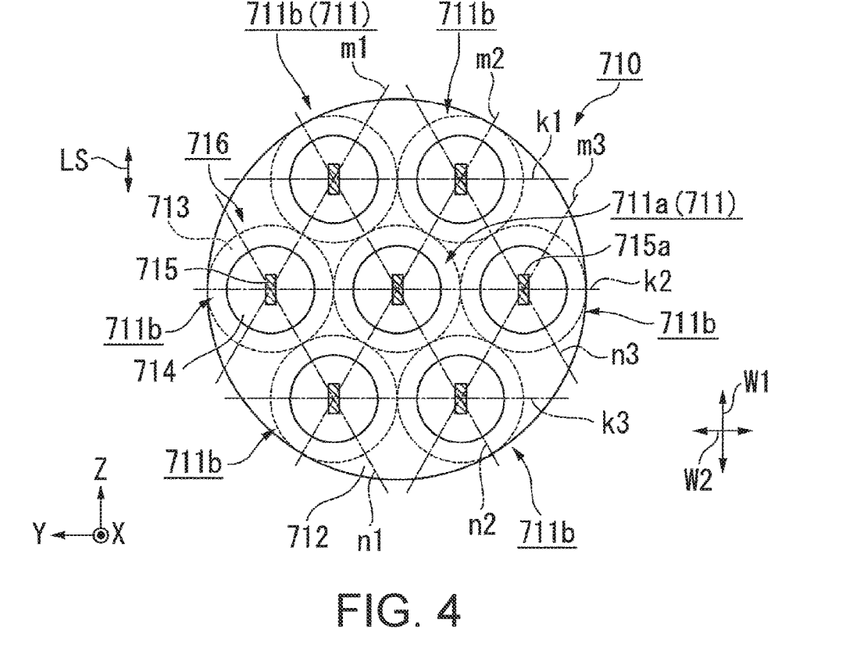
FIG. 4 is a front view of a light source section.

FIG. 4 is a front view of the light source section 710 viewed in the X direction.

As shown in FIG. 4, the light source section 710 is provided with the plurality of semiconductor lasers 711 (the light emitting device), and a holding member 712 for holding the plurality of semiconductor lasers 711. The semiconductor lasers 711 each emit a blue light beam LB1 (a light beam in a first wavelength band) in the X direction. The wavelength of the blue light beam LB1 is, for example, 455 nm±20 nm. In the present embodiment, the light source section 710 is provided with seven semiconductor lasers 711. Therefore, light including seven blue light beams LB1 is emitted as a whole of the light source section 710.

The semiconductor lasers 711 are each formed of a semiconductor laser of a CAN package type. The semiconductor lasers 711 are each provided with a semiconductor laser chip 715 (a light emitting element) and a housing 716 for housing the semiconductor laser chip 715. The housing 716 is constituted by a pedestal 713, and a can body 714 for covering a one surface side of the pedestal 713. Further, in the example shown in FIG. 4, one semiconductor laser chip 715 is housed inside each of the housings 716, but it is also possible to house a plurality of semiconductor laser chips 715 inside each of the housings 716.

The holding member 712 is formed of a plate member having circular shape viewed in the emission direction (the X direction) of the blue light beam LB1 from the light source section 710. The plate member is provided with 7 holes corresponding to the number of the semiconductor lasers 711, and each corresponding to the dimension of the can body 714. The material of the plate member is not particularly limited, but desirably be, for example, metal high in thermal conductivity. The semiconductor lasers 711 are each supported by the holding member 712 with one surface of the pedestal 713 having contact with a holding surface 712a of the holding member 712 in the state in which the can body 714 is inserted through the hole of the holding member 712. The holding member 712 holds the plurality of semiconductor lasers 711 at rotationally symmetric positions.

As shown in FIG. 4, one semiconductor laser 711a of the plurality of semiconductor lasers 711 is disposed on the holding member 712 so as to be located in a central part of the light source section 710. Other 6 semiconductor lasers 711b are disposed on the periphery of the semiconductor laser 711a at the center of the holding member 712 in a rotationally symmetric manner so as to surround the one semiconductor laser 711a at the center thereof.

The 6 semiconductor lasers 711b on the periphery are disposed on the holding member 712 so as to be arranged along a virtual circle circumscribing the 6 semiconductor lasers 711b centered on the one semiconductor laser 711a located at the center. In the present embodiment, it is assumed that the virtual circle roughly coincides with a circle forming a contour of the holding member 712. According to the arrangement described above, in the light source device 710, the angles formed between straight lines k1 through k3, m1 through m3, and n1 through n3 connecting the light emission centers of the respective semiconductor laser chips 715 to each other are equal to each other, and are all 60°. Further, in the plurality of semiconductor lasers 711, the housings 716 of the semiconductor lasers 711 adjacent to each other have contact with each other in the portions of the pedestals 713.

The 7 semiconductor lasers 711 are arranged so that the semiconductor laser chips 715 face to the same direction. In the light source section 710, the semiconductor lasers 711 are arranged so that the long sides of the respective semiconductor laser chips 715 become parallel to the Z axis. According to this arrangement, as indicated by the arrow denoted by the symbol LS, linearly-polarized light beams each having a polarization direction parallel to the Z axis are emitted as the blue light beams LB1. In the case of the present embodiment, the linearly-polarized light beam having the polarization direction parallel to the Z direction is the S-polarized light beam with respect to a polarization separating element described later. Hereinafter, the 7 blue light beams LB1 emitted from the light source section 710 are collectively referred to as blue light beams BL.

The semiconductor laser chips 715 each have a light emitting area 715a for emitting the light. The light emitting area 715a has a rectangular planar shape when viewed along the direction of the central axis of the blue light beam LB1 emitted, and has a long-side direction W1 and a short-side direction W2.

A divergence angle of the light toward the short-side direction W2 of the light emitting area 715a is larger than a divergence angle of the light toward the long-side direction W1 of the light emitting area 715a. Therefore, the cross-sectional surface perpendicular to the central axis LBc of the blue light beam LB1 has an elliptical shape. Specifically, the cross-sectional shape perpendicular to the central axis of the blue light beam LB1 is an elliptical shape having a long-axis direction and a short-axis direction. The long-axis direction of the elliptical shape corresponds to the short-side direction W2 of the light emitting area 715a. The short-axis direction of the elliptical shape corresponds to the long-side direction W1 of the light emitting area 715a.

Figure 5:
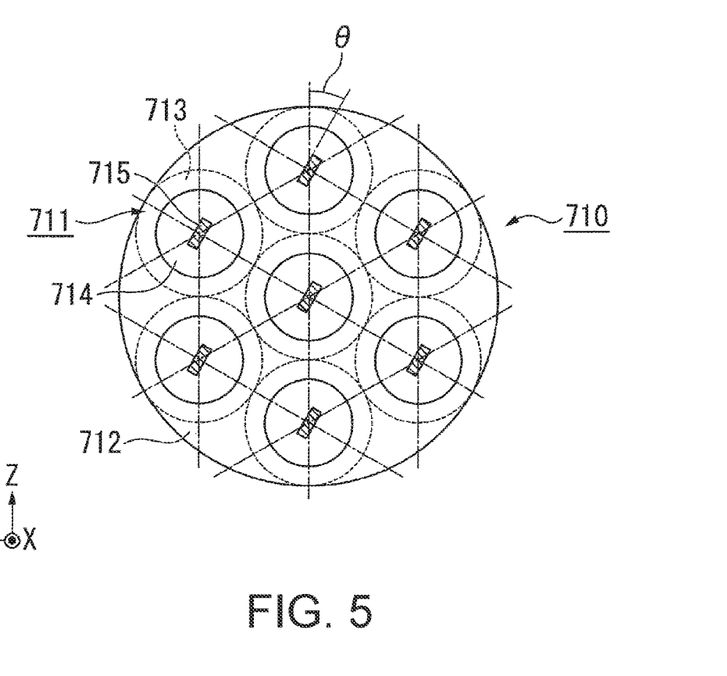
FIG. 5 is a front view showing an example of a reference posture of the light source section.

FIG. 5 is a front view of the light source section 710 set to a reference posture when white light is emitted from the illumination device 2.

As described above, in the case (the case in which the rotation of the light source section 710 is in a neutral state; see FIG. 4) in which the light source section 710 is disposed so that the long side of the light emitting area 715a of the semiconductor laser chip 715 becomes parallel to the Z axis, the blue light beams LB1 as the S-polarized light beams with respect to the polarization separation element 50 are emitted from all of the semiconductor lasers 711. In contrast, when using the projector 1, in other words, when the white illumination light WL is emitted from the illumination device 2, the semiconductor lasers 711 are arranged so that the long side of the light emitting area 715a of the semiconductor laser chip 715 forms a predetermined angle θ with the Z axis as shown in FIG. 5.

In other words, the light source section 710 is rotated as much as the predetermined angle θ with the posture shown in FIG. 4. As the angle θ of the light source section 710 is gradually increased from 0°, the proportion of the P-polarized light to the S-polarized light gradually increases, and when the angle θ of the light source section 710 reaches 90°, all of the blue light beams LB1 emitted from the light source section 710 turn to the P-polarized light beams. In the case in which the illumination device 2 emits the white illumination light WL, normally, the angle θ of the light source section 710 is set so that the proportion of the light intensity of the S-polarized light (a first light beam in the first polarization state) to the total light intensity becomes roughly 80%, and the proportion of the light intensity of the P-polarized light (a second light beam in the second polarization state) becomes roughly 20%.

As shown in FIG. 2, the blue light beams BL emitted from the light source device 21 enter the homogenizer optical system 24. The homogenizer optical system 24 converts the intensity distribution of the blue light beams BL into, for example, a uniform intensity distribution called a top-hat distribution. The homogenizer optical system 24 is constituted by a first lens array 24a and a second lens array 24b.

The blue light beams BL having been emitted from the homogenizer optical system 24 enter the polarization separation element 50. The polarization separation element 50 is arranged so as to form an angle of 45° with respect to each of the optical axis ax1 and the optical axis ax2. The polarization separation element 50 separates the blue light beams BL emitted from the light source section 710 into the S-polarized light beams BLs and the P-polarized light beams BLp with respect to the polarization separation element 50. Specifically, the polarization separation element 50 reflects the S-polarization component BLs of the blue light beam BL and transmits the P-polarization component BLp of the blue light beam BL. The S-polarization component BLs having been reflected by the polarization separation element 50 is used for the excitation of a polarization conversion layer, and is therefore referred to as excitation light BLs in the following description. The P-polarization component BLp having been transmitted through the polarization separation element 50 is used as a blue light component of the illumination light, and is therefore referred to as blue light BLp.

Further, the polarization separation element 50 has a color separation function of transmitting fluorescence YL having a yellow color different in wavelength band from the blue light beams BL emitted from the semiconductor lasers 711 irrespective of the polarization state of the fluorescence YL.

The excitation light BLs as the S-polarized light having been emitted from the polarization separation element 50 enters the first pickup optical system 26. The first pickup optical system 26 converges the excitation light $BL_s$ toward a phosphor layer 34 (the wavelength conversion layer) of the wavelength conversion device 27. The first pickup optical system 26 is constituted by a first pickup lens 26a and a second pickup lens 26b. It should be noted that the first pickup optical system 26 can also be formed of a single pickup lens.

The excitation light BLs having been emitted from the first pickup optical system 26 enters the wavelength conversion device 27. The wavelength conversion device 27 has the phosphor layer 34 and a substrate 35 for supporting the phosphor layer 34. The excitation light BLs enters the phosphor layer 34 to thereby excite the phosphor included in the phosphor layer 34, and thus, the yellow fluorescence YL (a third light beam in a second wavelength band) different in wavelength from the excitation light BLs is generated. In other words, the wavelength conversion device 27 has the phosphor layer 34 to be excited by the excitation light BLs, and converts the excitation light BLs into the fluorescence YL in a different wavelength band from the wavelength band of the excitation light BLs.

In the wavelength conversion device 27, the phosphor layer 34 is fixed to the substrate 35 with an adhesive 36 disposed between a side surface of the phosphor layer 34 and the substrate 35 in the state of making a surface of the phosphor layer 34 located on the opposite side to the side which the excitation light BLs enters have contact with the substrate 35. On the surface of the substrate 35 on the opposite side to the side on which the phosphor layer 34 is disposed, there is disposed a heatsink 38 for radiating the heat of the phosphor layer 34.

The fluorescence YL emitted from the phosphor layer 34 is non-polarized light with a non-uniform polarization direction, and therefore enters the polarization separation element 50 while keeping the non-polarized state after having passed through the first pickup optical system 26. The fluorescence YL is transmitted through the polarization separation element 50, and then proceeds toward the integrator optical system 31.

On the other hand, the blue light BLp as the P-polarized light having been emitted from the polarization separation element 50 enters the conversion optical system 41. The conversion optical system 41 is provided with the wave plate 28, a second pickup optical system 29, and a diffuse reflection element 30. The conversion optical system 41 converts the blue light BLp as the P-polarized light into blue light BLs' as diffused S-polarized light.

The blue light BLp enters the wave plate 28. The wave plate 28 is disposed in the light path between the polarization separation element 50 and the diffuse reflection element 30, and is formed of a quarter wave plate. Therefore, the blue light BLp as the P-polarized light having been emitted from the polarization separation element 50 is converted by the wave plate 28 into blue light BLc as the circularly polarized light, and then enters the second pickup optical system 29.

The second pickup optical system 29 converges the blue light BLc toward the diffuse reflection element 30. The second pickup optical system 29 is constituted by a first pickup lens 29a and a second pickup lens 29b.

The diffuse reflection element 30 diffusely reflects the blue light BLc, which has been emitted from the second pickup optical system 29, toward the polarization separation element 50. In particular, it is preferable to use a diffuse reflection element for causing Lambertian reflection of the blue light BLc having entered the diffuse reflection element as the diffuse reflection element 30. In the illumination device 2, by using this kind of diffuse reflection element 30, it is possible to obtain blue light BLc' having a roughly uniform illuminance distribution while diffusely reflecting the blue light BLc.

The blue light BLc' having diffusely been reflected by the diffuse reflection element 30 enters the wave plate 28 once again to thereby be converted from the blue light BLc' as the circularly polarized light into the blue light BLs' as the S-polarized light. Therefore, the blue light BLs' (a fourth light beam) as the S-polarized light is emitted from the conversion optical system 41. The blue light BLs' as the S-polarized light enters the polarization separation element 50. The blue light BLs' as the S-polarized light is reflected by the polarization separation element 50, and then proceeds toward the integrator optical system 31.

In such a manner as described above, the blue light BLs' is used as the illumination light WL together with the fluorescence YL having been transmitted through the polarization separation element 50. In other words, the blue light BLs' and the fluorescence YL are emitted from the polarization separation element 50 toward the same direction. In such a manner as described above, there can be obtained the white illumination light WL having the blue light BLs' and the yellow fluorescence YL combined with each other. In other words, the polarization separation element 50 also has a function of a color combining element for combining the blue light BLs' and the fluorescence YL with each other. The polarization separation element 50 also corresponds to a color combining element in the appended claims.

The illumination light WL having been emitted from the polarization separation element 50 enters the integrator optical system 31. The integrator optical system 31 divides the illumination light WL into a plurality of light beams. The integrator optical system 31 is constituted by a first lens array 31a and a second lens array 31b. The first lens array 31a and the second lens array 31b each have a configuration having a plurality of lenses arranged in an array.

The superimposing optical system 33 is constituted by the integrator optical system 31 formed of the first lens array 31a and the second lens array 31b, and the superimposing lens 33a. The illumination light WL having been emitted from the integrator optical system 31 enters the polarization conversion element 32. The polarization conversion element 32 uniforms the polarization direction of the illumination light WL. The polarization conversion element 32 is constituted by a polarization separation film, a wave plate, and a mirror all not shown. The polarization conversion element 32 converts one of the polarization components into the other of the polarization components, for example, the P-polarization component into the S-polarization component, in order to uniform the polarization direction of the fluorescence YL as the non-polarized light and the polarization direction of the blue light BLs' as the S-polarized light.

On the light path between the integrator optical system 31 (the superimposing optical system 33) and the polarization conversion element 32, there is disposed the light intensity monitoring mirror 42 (a mirror). The light intensity monitoring mirror 42 is disposed on the light path of the light beam emitted from one of the lenses provided to the second lens array 31b, and between the second lens array 31b and the superimposing lens 33a. The light intensity monitoring mirror 42 is disposed so as to form an angle of 45° with the optical axis ax2. The light intensity monitoring mirror 42 transmits a part of the incident light, and reflects the rest of the incident light. The light having been transmitted through the light intensity monitoring mirror 42 enters the polarization conversion element 32, and the light having been reflected by the light intensity monitoring mirror 42 enters the sensor unit 43 (a detection device). The detailed configuration of the sensor unit 43 will be described later.

The light intensity monitoring mirror 42 is disposed at a position where the secondary light source image of the blue light beams BL having been emitted from the semiconductor lasers 711 is formed. Here, there is shown an example in which the light intensity monitoring mirror 42 is disposed on the light path between the integrator optical system 31 and the polarization conversion element 32. Instead of this example, it is also possible to adopt a configuration in which the light intensity monitoring mirror 42 is disposed on the light path between the polarization conversion element 32 and the superimposing lens 33a.

The illumination light WL, which has passed through the polarization conversion element 32 to thereby be uniformed in the polarization direction, enters the superimposing lens 33a. The superimposing lens 33a superimposes the light beams having been emitted from the polarization conversion element 32 with each other on the illumination target area. Thus, it is possible to evenly illuminate the illumination target area.

In the case of the present embodiment, since the light intensity monitoring mirror 42 is disposed at the forming position of the secondary light source image on the light path between the integrator optical system 31 and the polarization conversion element 32, even if taking out a part of the light with the light intensity monitoring mirror 42, there is no chance of generating an illuminance variation on the red-light light modulation device 4R, the green-light light modulation device 4G, and the blue-light light modulation device 4B as the illumination target area. Therefore, if the illuminance deterioration as much as one secondary light source image can be allowed, it is not necessarily required for the light intensity monitoring mirror 42 to be a mirror for transmitting a part of the light and reflecting the rest of the light, and it is also possible for the light intensity monitoring mirror 42 to be a mirror for reflecting the whole of the light.

Figure 6:
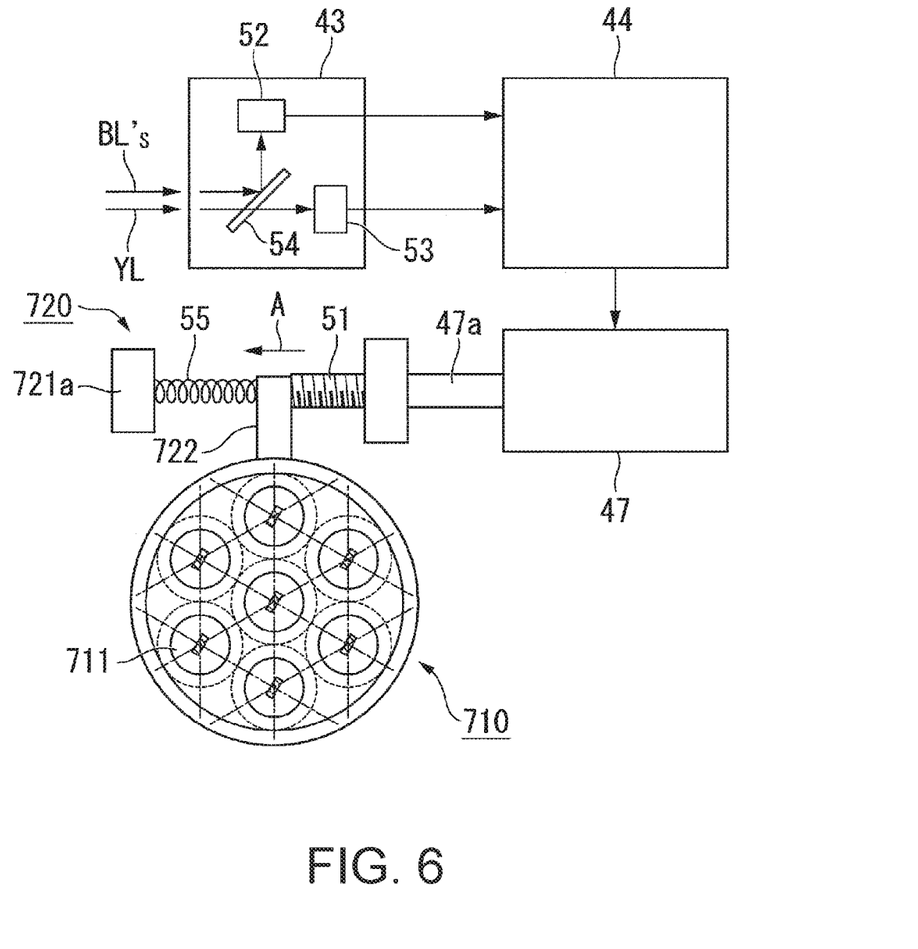
FIG. 6 is a schematic diagram showing the light source section, a control device and a detection device.

Hereinafter, the details of the rotation mechanism 720 of the light source section 710 will be described.

As shown in FIG. 6, a spring 55 is disposed in a space between the rod-like section 722 provided to the light source section 710 and a wall part 721a of the frame section 721. Further, a screw member 51 is fixed to a tip of a rotary shaft 47a of the motor 47. When the screw member 51 rotates due to the rotation of the motor 47, the screw member 51 pushes the rod-like section 722 in the direction of the arrow A shown in FIG. 6, and the light source section 710 rotates counterclockwise. When the force of the screw member 51 pushing the rod-like section 722 is released, the light source section 710 rotates clockwise due to the action of the spring 55 to return to the neutral position.

Due to the rotation of the light source section 710, the polarization direction of each of the blue light beams LB1 emitted from the light source section 710 rotates, and the content ratios of the S-polarized light and the P-polarized light to the total light intensity of the blue light beams BL emitted from the light source section 710 change. In the reference posture of the light source section 710 for emitting the white illumination light WL, there is created the state in which the screw member 51 pushes the rod-like section 722 to rotate the light source section 710 counterclockwise as much as a predetermined angle from the neutral position. The control section 44 rotates the light source section 710 around the central axis of the blue light beams BL emitted from the light source section 710 to thereby change the polarization state of the light emitted from the light source section 710.

The sensor unit 43 is provided with a dichroic mirror for separating the blue light BLs' and the yellow fluorescence YL from each other, a blue light sensor 52 for detecting the intensity of the blue light BLs', and a yellow light sensor 53 for detecting the intensity of the yellow fluorescence YL. The light having been taken out from the light intensity monitoring mirror 42 enters the sensor unit 43, and the blue light BLs' and the yellow fluorescence YL are separated from each other by the dichroic mirror 54. The intensity of the blue light BLs' (the fourth light beam) is detected by the blue light sensor 52. The intensity of the yellow fluorescence YL (the third light beam) is detected by the yellow light sensor 53.

The detection result of the intensity of the blue light BLs' and the intensity of the yellow fluorescence YL from the sensor unit 43 is output to the control device 44. The control device 44 changes the polarization state of the light emitted from the light source section 710, specifically, rotates the light source section 710 to change the polarization direction of the blue light beams BL emitted from the light source section 710, so that the ratio between the intensity of the blue light BLs' (the fourth light beam) and the intensity of the yellow fluorescence YL (the third light beam) comes closer to a reference value. It is also possible for the reference value of the ratio between the intensity of the blue light BLs' (the fourth light beam) and the intensity of the yellow fluorescence YL (the third light beam) to be a value determined based on the intensity of the initial blue light BLs' (the fourth light beam) and the intensity of the initial yellow fluorescence YL (the third light beam) at the moment when starting the use of the projector 1 measured by the sensor unit 43. Alternatively, it is also possible to use a design value of the projector 1 as the reference value of the ratio between the intensity of the blue light BLs' and the intensity of the yellow fluorescence YL.

Here, there is assumed the case in which the intensity of the light emitted from the semiconductor lasers 711 drops due to the temporal change of the projector 1.

Figure 7:
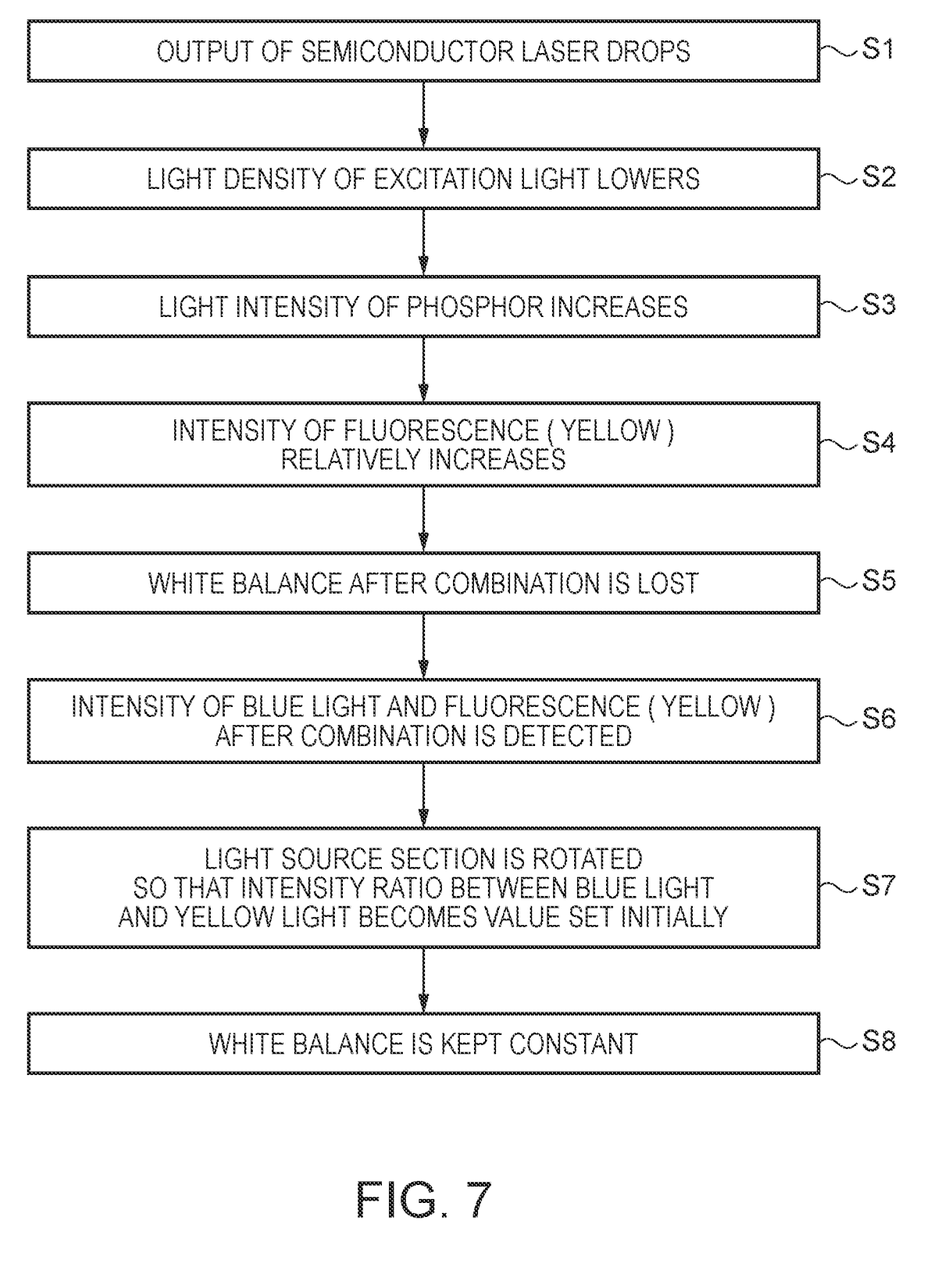
FIG. 7 is a flow chart showing a concept of an adjustment of the color balance.

The concept of the countermeasure of the present embodiment against the misalignment of the white balance caused in this case will be described based on the flow chart shown in FIG. 7.

When the output of the semiconductor lasers 711 drops (step S1), the light intensity of the excitation light BLs for exciting the phosphor layer 34 drops accordingly. The drop of the light intensity of the excitation light BLs is equivalent to the drop of the light density (the light intensity per unit area) of the excitation light BLs (step S2). The phosphor has a characteristic that the conversion efficiency when converting the excitation light into the fluorescence rises as the light density of the excitation light drops. Therefore, even if the light intensity of the excitation light BLs drops, when the increment of the fluorescence YL due to the rise in conversion efficiency exceeds the decrement of the fluorescence due to the light intensity drop of the excitation light BLs, the light intensity of the fluorescence YL emitted from the phosphor layer 34 increases (step S3). Here, the explanation will be presented citing the case in which the light intensity of the fluorescence YL increases as an example, but the light intensity of the fluorescence YL decreases in some cases. However, in both of the cases, the white balance is lost.

Due to the drop of the output of the semiconductor lasers 711, both of the light intensity of the blue light BLs' and the light intensity of the excitation light BLs drop. However, since the conversion efficiency of the phosphor rises, the light intensity of the fluorescence YL with respect to the light intensity of the blue light BLs' relatively increases (step S4). As a result, the ratio between the blue light BLs' and the yellow fluorescence YL changes, and the white balance of the white light as the composite light of the blue light BLs' and the yellow fluorescence YL is lost (step S5) with respect to that before the temporal change. Specifically, since the light intensity of the yellow fluorescence YL with respect to the light intensity of the blue light BLs' relatively increases, the composite light changes to the yellowish-white light.

Here, the intensity of the blue light BLs' included in the light taken out with the light intensity monitoring mirror 42 and the intensity of the yellow fluorescence YL included in the light are detected (step S6) by the sensor unit 43. The control device 44 stores in advance the reference value of the ratio between the blue light intensity and the yellow light intensity determined based on the initial intensity values at the moment when starting the use of the projector 1. The control device 44 compares the current ratio between the blue light intensity and the yellow light intensity detected by the sensor unit 43 with the reference value having already been stored. As a result, in the case in which the difference between the current ratio between the blue light intensity and the yellow light intensity, and the reference value exceeds an allowable range, the light source section 710 is rotated (step S7) so that the current ratio between the blue light intensity and the yellow light intensity comes closer to the reference value (the initial value). Specifically, the control device 44 sets the posture in which the light source section 710 is rotated until the long-axis direction of the blue light beams BL has a predetermined angle with a plane including the central axis of the blue light beams BL as the reference posture of the light source section 710, and rotates the light source section 710 from the reference posture in accordance with the detection result by the sensor unit 43.

By rotating the light source section 710 as much as the predetermined angle, it is possible to adjust the ratio between the light intensity of the S-polarization component BLs generated in the light source section 710 and the light intensity of the P-polarization component BLp generated in the light source section 710. Specifically, in order to increase the light intensity of the blue light BLs' and decrease the light intensity of the yellow fluorescence YL, it is sufficient to relatively increase the light intensity of the P-polarization component BLp and relatively decrease the light intensity of the S-polarization component BLs. Thus, since the light intensity of the P-polarization component BLp to turn to the blue light transmitted through the polarization separation element 50 relatively increases compared to the case in which the white balance of the white light is lost, the composite light becomes the light closer to the white light, and it is possible to improve the white balance.

As described hereinabove, the illumination device 2 according to the present embodiment is equipped with the light source section 710 having the 7 semiconductor lasers 711 held at the rotationally symmetric positions. Further, the 7 semiconductor lasers 711 are arranged on the holding member 712 so that the 6 semiconductor lasers 711b located on the outer periphery are inscribed in a virtual circle, the single semiconductor laser 711a located at the central part has contact with the 6 semiconductor lasers 711b, and the angles formed between the straight lines k1 through k3, m1 through m3, and n1 through n3 each connecting the light emission centers become equal to each other. Thus, the downsizing of the light source section 710 can be achieved. Further, since the control device 44 rotates the light source section 710 in accordance with the detection result of the sensor unit 43 to change the polarization state of the blue light beams BL, there is no need to use the wave plate for the adjustment of the polarization state. Thus, it is possible to realize the illumination device 2 small in size and capable of adjusting the white balance without using the wave plate.

Further, in the illumination device 2 according to the present embodiment, since the control device 44 rotates the light source section 710 to change the polarization direction of the blue light beams BL from the light source section 710 so that the ratio between the intensity of the blue light BLs' and the intensity of the yellow fluorescence YL comes closer to the reference value, it is possible to perform the adjustment of the white balance so that the color of the illumination light WL comes closer to the white color as the reference. Further, in the case in which the reference value is determined based on the initial intensity of the blue light BLs' and the initial intensity of the yellow fluorescence YL detected by the sensor unit 43, it is possible to perform the adjustment of the white balance so as to come closer to the color of the illumination light in the initial state of the individual illumination device 2 instead of the color of the illumination light as the design value.

Further, in the illumination device 2 according to the present embodiment, the light intensity monitoring mirror 42 is disposed between the integrator optical system 31 and the polarization conversion element 32. Therefore, it is possible to take out a part of the illumination light before entering the superimposing lens 33a with the light intensity monitoring mirror 42, then guide the part of the illumination light thus taken out to the sensor unit 43, and then perform the intensity detection of the blue light BLs' and the fluorescence YL with high accuracy. As a result, the adjustment of the white balance can be performed with high accuracy.

Further, in the illumination device 2 according to the present embodiment, since the 7 semiconductor lasers 711 are arranged in a circular shape, and the holding member 712 for holding these semiconductor lasers 711 has a circular shape, it is possible to simplify the configuration of the rotation mechanism 720 of the light source section 710.

The projector 1 according to the present embodiment is equipped with the illumination device 2 described above, and is therefore excellent in color reproducibility, and excellent in display quality.

Second Embodiment

Hereinafter, a second embodiment of the invention will be described using FIG. 8.

The basic configuration of a projector and an illumination device according to the second embodiment is roughly the same as that in the first embodiment, and the configuration of the light source section is different from that of the first embodiment. Therefore, the description of the whole of the projector and the illumination device will be omitted, and only the different part will be described.

Figure 8:
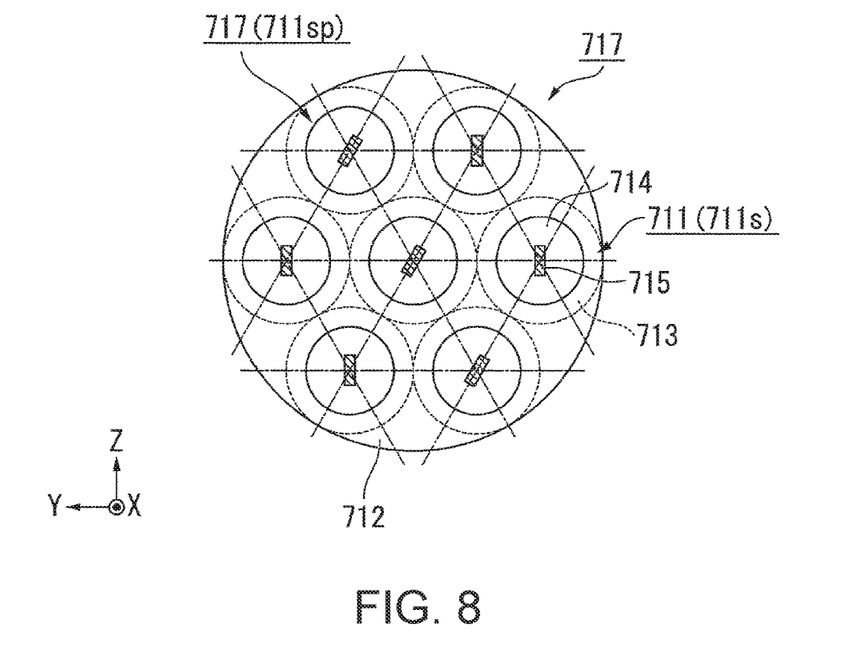
FIG. 8 is a front view showing a light source section of an illumination device according to a second embodiment.

FIG. 8 is a front view of the light source section of the illumination device according to the present embodiment.

In FIG. 8, the constituents common to FIG. 4 used in the first embodiment are denoted by the same reference symbols, and the description thereof will be omitted.

As shown in FIG. 8, in the light source section 717 of the present embodiment, the 7 semiconductor lasers 711 are not arranged so that all of the semiconductor laser chips 715 face to the same direction. Specifically, some semiconductor lasers 711s of the plurality of semiconductor lasers 711 are held by the holding member 712 so that the long side of the semiconductor laser chip 715 becomes parallel to the Z axis. Other semiconductor lasers 711sp are held by the holding member 712 so that the long side of the semiconductor laser chip 715 has a predetermined angle with the Z axis.

In the present embodiment, it is assumed that the number of the semiconductor lasers 711s having the semiconductor laser chip 715 disposed so that the long side thereof is parallel to the Z axis is four, and the number of the semiconductor lasers 711sp having the semiconductor laser chip 715 with the long side forming the predetermined angle with the Z axis is three, but the numbers of the semiconductor lasers 711s, 711sp are not limited to this example. The arrangement shown in FIG. 8 corresponds to the neutral position of the rotation mechanism of the light source section 717.

In the light source section 717 of the present embodiment, four blue light beams each formed of the S-polarized light are emitted from the four semiconductor lasers 711s. The three blue light beams each including the S-polarization component and the P-polarization component are emitted from the three semiconductor lasers 711sp. The reference posture of the light source section 717 is set so that the proportion of the light intensity of the S-polarized light (the first light beam in the first polarization state) to the total light intensity becomes roughly 80%, and the proportion of the light intensity of the P-polarized light (the second light beam in the second polarization state) becomes roughly 20% when combining the four blue light beams and the three blue light beams with each other.

The rest of the configuration of the illumination device is substantially the same as that of the first embodiment.

In the case of the present embodiment, the control device 44 sets the posture in which the some semiconductor lasers 711sp are held by the holding member 712 so that the long axis direction of the some semiconductor lasers 711sp has a predetermined angle with the plane including the central axis of the blue light beam out of the plurality of semiconductor lasers 711 as the reference posture, and rotates the light source section 717 from the reference posture in accordance with the detection result of the sensor unit 43.

Also in the present embodiment, there can be obtained substantially the same advantage as in the first embodiment that it is possible to realize the illumination device small in size and capable of adjusting the white balance without using the wave plate.

Third Embodiment

A third embodiment of the invention will hereinafter be described using FIG. 9.

The basic configuration of a projector and an illumination device according to the third embodiment is roughly the same as that in the first embodiment, and the configuration of the light source section is different from that of the first embodiment. Therefore, the description of the whole of the projector and the illumination device will be omitted, and only the different part will be described.

Figure 9:
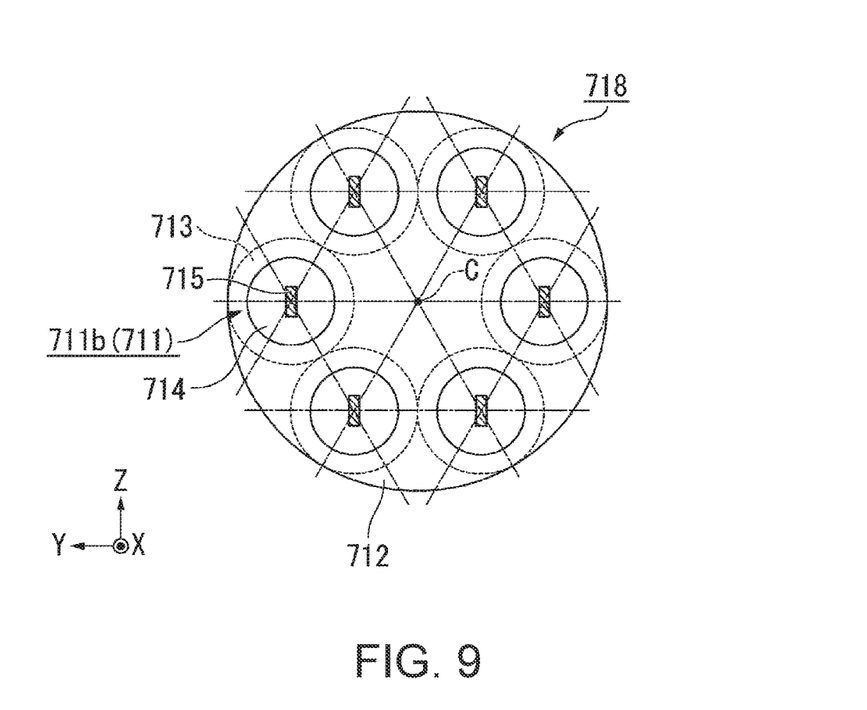
FIG. 9 is a front view showing a light source section of an illumination device according to a third embodiment.

FIG. 9 is a front view of the light source section of the illumination device according to the present embodiment.

In FIG. 9, the constituents common to FIG. 4 used in the first embodiment are denoted by the same reference symbols, and the description thereof will be omitted.

As shown in FIG. 9, the light source section 718 is provided with the 6 semiconductor lasers 711 and the holding member 712. Therefore, the light source section 718 emits light including six blue light beams LB1. The 6 semiconductor lasers 711 are disposed in the peripheral part except the center of the holding member 712.

The 6 semiconductor lasers 711 are rotationally symmetric about the center C of the holding member 712, and are disposed equally distant from the center C. Further, the 6 semiconductor lasers 711b are arranged on the holding member 712 so as to be located on a virtual circle circumscribing the 6 semiconductor lasers 711b. Further, in the 6 semiconductor lasers 711b, the housings 716 of the semiconductor lasers 711b adjacent to each other have contact with each other in the portions of the pedestals 713.

The rest of the configuration of the illumination device is substantially the same as that of the first embodiment.

Also in the present embodiment, there can be obtained substantially the same advantage as in the first embodiment that it is possible to realize the illumination device small in size and capable of adjusting the white balance without using the wave plate.

It should be noted that the scope of the invention is not limited to the embodiments described above, but a variety of modifications can be provided thereto within the scope or the spirit of the invention.

For example, in the embodiments described above, there is cited the illumination device in which the light source device is provided with 6 or 7 semiconductor lasers, but the number of the semiconductor lasers of the light source device is not limited thereto, and it is sufficient to provide a plurality of light emitting devices arranged in a rotationally symmetric manner.

Further, the number, the arrangement, the shape, the material, the dimensions and so on of the constituents of the illumination device and the projector illustrated in the embodiments described above can arbitrarily be modified.

Although in the embodiments described above, there is illustrated the projector provided with the three light modulation devices, the invention can also be applied to a projector for displaying a color picture using a single light modulation device. Further, a digital mirror device can also be used as the light modulation device.

Further, although in the embodiments described above, there is described the example of applying the illumination device according to the invention to the projector, the invention is not limited to this example. The illumination device according to the invention can also be applied to lighting equipment such as a headlight for a vehicle.

The entire disclosure of Japanese Patent Application No. 2017-185853, filed on Sep. 27, 2017 is expressly incorporated by reference herein.

What is claimed is:

1. An illumination device comprising:
    a light source section including a plurality of light emitting devices adapted to emit light in a first wavelength band, and a holding member adapted to hold the plurality of light emitting devices at rotationally symmetric positions, each of the light emitting devices being formed of a semiconductor laser provided with a light emitting element, and a housing adapted to house the light emitting element inside,
    an optical element adapted to separate the light emitted from the light source section into a first light beam in a first polarization state and a second light beam in a second polarization state;
    a wavelength conversion device having a wavelength conversion layer to be excited by light in the first wavelength band, and adapted to convert the first light beam into a third light beam in a second wavelength band different from the first wavelength band;
    a conversion optical system adapted to convert the second light beam into a fourth light beam, the optical element being adapted to combine the third light beam and the fourth light beam with each other;
    a detection device adapted to detect an intensity of the third light beam and an intensity of the fourth light beam; and
    a control device adapted to change a polarization state of the light emitted from the light source section in accordance with a detection result by the detection device,
    wherein the control device rotates the light source section around a central axis of the light emitted from the light source section to thereby change a polarization state of the light emitted from the light source section.

2. The illumination device according to claim 1, wherein
the plurality of the light emitting devices of the light source section comprises seven light emitting devices, and
one of the seven light emitting devices is disposed on the holding member so as to be located in a central part of the light source section, and other six of the light emitting devices are disposed in a rotationally symmetric manner about a center of the holding member so as to surround the one of the seven light emitting devices.

3. The illumination device according to claim 2, wherein
the seven light emitting devices are disposed on the holding member so that the six light emitting devices are inscribed in a virtual circle centered on the center of the holding member, the one light emitting device has contact with the six light emitting devices, and angles formed between straight lines connecting light emission centers of the seven light emitting devices become equal to each other.

4. A projector comprising:
the illumination device according to claim 3;
a light modulation device adapted to modulate light from the illumination device in accordance with image information to thereby form image light; and
a projection optical system adapted to project the image light.

5. A projector comprising:
the illumination device according to claim 2;
a light modulation device adapted to modulate light from the illumination device in accordance with image information to thereby form image light; and
a projection optical system adapted to project the image light.

6. The illumination device according to claim 1, wherein
the plurality of the light emitting devices of the light source section comprises six light emitting devices, and
the six light emitting devices are rotationally symmetric about a center of the holding member, and are disposed equally distant from the center of the holding member.

7. A projector comprising:
the illumination device according to claim 6;
a light modulation device adapted to modulate light from the illumination device in accordance with image information to thereby form image light; and
a projection optical system adapted to project the image light.

8. The illumination device according to claim 1, wherein
the holding member has a circular shape.

9. A projector comprising:
the illumination device according to claim 8;
a light modulation device adapted to modulate light from the illumination device in accordance with image information to thereby form image light; and
a projection optical system adapted to project the image light.

10. A projector comprising:
the illumination device according to claim 1;
a light modulation device adapted to modulate light from the illumination device in accordance with image information to thereby form image light; and
a projection optical system adapted to project the image light.

11. An illumination device comprising:
a light source section including a plurality of light emitting devices adapted to emit light in a first wavelength band, and a holding member adapted to hold the plurality of light emitting devices at rotationally symmetric positions, each of the light emitting devices being formed of a semiconductor laser provided with a light emitting element, and a housing adapted to house the light emitting element inside, an optical element adapted to separate the light emitted from the light source section into a first light beam in a first polarization state and a second light beam in a second polarization state;

a wavelength conversion device having a wavelength conversion layer to be excited by light in the first wavelength band, and adapted to convert the first light beam into a third light beam in a second wavelength band different from the first wavelength band;

a conversion optical system adapted to convert the second light beam into a fourth light beam, the optical element being adapted to combine the third light beam and the fourth light beam with each other;

a detection device adapted to detect an intensity of the third light beam and an intensity of the fourth light beam; and a control device adapted to change a polarization state of the light emitted from the light source section in accordance with a detection result by the detection device, wherein a cross-sectional shape perpendicular to a central axis of the light emitted from the semiconductor laser is an elliptical shape having a long-axis direction and a short-axis direction, and the control device sets a posture in which the light source section is rotated until the long-axis direction has a predetermined angle with a plane including the central axis of the light emitted from the semiconductor laser as a reference posture of the light source section, and rotates the light source section from the reference posture in accordance with a detection result by the detection device.

12. The illumination device according to claim 11, wherein
the plurality of the light emitting devices of the light source section comprises seven light emitting devices, and
one of the seven light emitting devices is disposed on the holding member so as to be located in a central part of the light source section, and other six of the light emitting devices are disposed in a rotationally symmetric manner about a center of the holding member so as to surround the one of the seven light emitting devices.

13. The illumination device according to claim 12, wherein
the seven light emitting devices are disposed on the holding member so that the six light emitting devices are inscribed in a virtual circle centered on the center of the holding member, the one light emitting device has contact with the six light emitting devices, and angles formed between straight lines connecting light emission centers of the seven light emitting devices become equal to each other.

14. The illumination device according to claim 12, wherein
the seven light emitting devices are disposed on the holding member so that the six light emitting devices are inscribed in a virtual circle centered on the center of the holding member, the one light emitting device has contact with the six light emitting devices, and angles formed between straight lines connecting light emission centers of the seven light emitting devices become equal to each other.

15. The illumination device according to claim 11, wherein
the plurality of the light emitting devices of the light source section comprises six light emitting devices, and
the six light emitting devices are rotationally symmetric about a center of the holding member, and are disposed equally distant from the center of the holding member.

16. A projector comprising:
the illumination device according to claim 11;
a light modulation device adapted to modulate light from the illumination device in accordance with image information to thereby form image light; and
a projection optical system adapted to project the image light.

17. An illumination device comprising:
a light source section including a plurality of light emitting devices adapted to emit light in a first wavelength band, and a holding member adapted to hold the plurality of light emitting devices at rotationally symmetric positions, each of the light emitting devices being formed of a semiconductor laser provided with a light emitting element, and a housing adapted to house the light emitting element inside, an optical element adapted to separate the light emitted from the light source section into a first light beam in a first polarization state and a second light beam in a second polarization state;

a wavelength conversion device having a wavelength conversion layer to be excited by light in the first wavelength band, and adapted to convert the first light beam into a third light beam in a second wavelength band different from the first wavelength band;

a conversion optical system adapted to convert the second light beam into a fourth light beam, the optical element being adapted to combine the third light beam and the fourth light beam with each other;

a detection device adapted to detect an intensity of the third light beam and an intensity of the fourth light beam; and a control device adapted to change a polarization state of the light emitted from the light source section in accordance with a detection result by the detection device, wherein a cross-sectional shape perpendicular to a central axis of the light emitted from the semiconductor laser is an elliptical shape having a long-axis direction and a short-axis direction, and the control device sets a posture in which some of the light emitting devices are held by the holding member so that the long-axis direction of the some of the light emitting devices has a predetermined angle with a plane including the central axis of the light emitted from the semiconductor laser as a reference posture of the light source section, and rotates the light source section from the reference posture in accordance with a detection result by the detection device.

18. The illumination device according to claim 17, wherein
the plurality of the light emitting devices of the light source section comprises seven light emitting devices, and
one of the seven light emitting devices is disposed on the holding member so as to be located in a central part of the light source section, and other six of the light emitting devices are disposed in a rotationally symmetric manner about a center of the holding member so as to surround the one of the seven light emitting devices.

19. The illumination device according to claim 17, wherein
the plurality of the light emitting devices of the light source section comprises six light emitting devices, and
the six light emitting devices are rotationally symmetric about a center of the holding member, and are disposed equally distant from the center of the holding member.

20. A projector comprising:
the illumination device according to claim 17;
a light modulation device adapted to modulate light from the illumination device in accordance with image information to thereby form image light; and
a projection optical system adapted to project the image light.

* * * * *